(12) United States Patent
Schlosser et al.

(10) Patent No.: US 6,864,323 B2
(45) Date of Patent: Mar. 8, 2005

(54) COMPOSITION FOR IMPROVING SCORCH CONDITIONS IN THE PREPARATION OF GRAFTED AND/OR CROSSLINKED POLYMERS AND OF FILLED PLASTICS

(75) Inventors: Thomas Schlosser, Inzlingen (DE); Aristidis Ioannidis, Rheinfelden (DE)

(73) Assignee: Degussa AG, Duesseldorf (DE)

( * ) Notice: Subject to any disclaimer, the term of this patent is extended or adjusted under 35 U.S.C. 154(b) by 0 days.

(21) Appl. No.: 10/225,201

(22) Filed: Aug. 22, 2002

(65) Prior Publication Data

US 2003/0114604 A1 Jun. 19, 2003

(30) Foreign Application Priority Data

Aug. 30, 2001 (DE) .......................................... 101 42 555

(51) Int. Cl.$^7$ ............................................. C08F 230/08
(52) U.S. Cl. ........................ 525/254; 526/335; 526/347
(58) Field of Search .................... 525/254; 526/335, 526/347; 524/495, 496, 261

(56) References Cited

U.S. PATENT DOCUMENTS

| | | |
|---|---|---|
| 3,646,155 A | 2/1972 | Scott |
| 4,117,195 A | 9/1978 | Swarbrick et al. |
| 5,245,084 A | 9/1993 | Groepper et al. |
| 5,282,998 A | 2/1994 | Horn et al. |
| 5,292,791 A | 3/1994 | Groepper et al. |
| 6,258,585 B1 | 7/2001 | Draper |
| 6,323,356 B1 | 11/2001 | Lowenberg et al. |
| 6,403,228 B1 | 6/2002 | Mack et al. |
| 6,500,883 B1 | 12/2002 | Mack et al. |
| 6,528,585 B1 | 3/2003 | Standke et al. |
| 6,559,219 B2 * | 5/2003 | Tadaki et al. ............... 524/495 |

FOREIGN PATENT DOCUMENTS

| | | |
|---|---|---|
| DE | 19 63 571 C3 | 10/1970 |
| DE | 21 51 270 C3 | 4/1972 |
| DE | 25 54 525 C3 | 6/1979 |
| EP | 0 346 863 A1 | 12/1989 |
| GB | 1346588 | 10/1970 |
| JP | 09302043 A | 11/1997 |

OTHER PUBLICATIONS

J. Groepper, "Scorch–verzögemde Peroxide für die Vernetzung von Elastomeren und Polyolefinen", GAK Feb. 1994 (47), pp. 83–88.

* cited by examiner

*Primary Examiner*—Robert D. Harlan
(74) *Attorney, Agent, or Firm*—Oblon, Spivak, McClelland, Maier & Neustadt, P.C.

(57) ABSTRACT

A composition containing (i) at least one silicon-containing compound, (ii) at least one peroxidic free-radical initiator, and (iii) at least one conjugated hydrocarbon and/or at least one organofunctional silane of the general formula I:

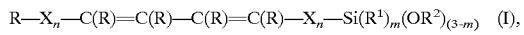

$$R-X_n-C(R)=C(R)-C(R)=C(R)-X_n-Si(R^1)_m(OR^2)_{(3-m)} \quad (I),$$

may be used in the preparation of grafted and/or crosslinked polymers, or of filled plastics, in order to improve scorch performance. Processes for preparing polymers or preparing plastics, and polymers and plastics which are obtainable via the Sioplas process or via the Monosil process, and products produced from them can utilize the composition.

25 Claims, No Drawings

COMPOSITION FOR IMPROVING SCORCH CONDITIONS IN THE PREPARATION OF GRAFTED AND/OR CROSSLINKED POLYMERS AND OF FILLED PLASTICS

BACKGROUND OF THE INVENTION

1. Field of the Invention

The present invention relates to a composition or formulation for improving scorch conditions in the preparation of grafted and/or crosslinked polymers, and of filled plastics, where a silicon-containing compound, a free-radical initiator and a free-radical scavenger are present in the composition. The present invention also relates to polymers and to filled plastics which are obtainable using a formulation of this type, and to appropriate processes for preparing said polymers and plastics, and to items based on these polymers or plastics.

2. Discussion of the Background

It is known that in the preparation of moisture-crosslinkable polymers silanes may be grafted onto polymer chains in the presence of a free-radical generator (FRG) and that the crosslinking by moisture is then carried out after shaping.

It is also known that in the preparation of highly filled polymer/filler systems, i.e. filled plastics, silanes are grafted onto polymer chains in the presence of an FRG, thus bringing about or improving the compatibility of the inorganic and organic components.

The term "scorch" covers the processing period, concluding with the onset of the FRG-initiated reaction, of a polymer mixture which is being grafted and/or crosslinked during preparation or processing, and which comprises FRG. A disadvantage here is that, in particular when using types of polymer susceptible to reaction on contact with free radicals, for example polyethylene (PE) with a narrow molar mass distribution and/or with a high molecular weight, polypropylene (PP), ethylene-vinyl acetate copolymer (EVA) with vinyl acetate (VA) content of from 0 to 40% by weight, ethylene-propylene-diene terpolymer (EPDM, "rubber"), or ethylene-propylene elastomer (EPM), some degree of deactivation of the free radicals takes place through undesired side-reactions before the material leaves the processing plants. The results include low reaction conversions, nonuniform distribution of the reacted starting components, low output rates due to undesired viscosity increase of the polymer material to be processed, and also solid particles which have an adverse effect on product quality.

The crosslinking by moisture of polymers using hydrolyzable unsaturated silanes is used worldwide in producing cables, pipes, foams, etc. Processes of this type are known as the Sioplas process (DE 19 63 571 C3, DE 21 51 270 C3, U.S. Pat. No. 3,646,155) and the Monosil process (DE 25 54 525 C3, U.S. Pat. No. 4,117,195). In the Monosil process, the crosslinking catalyst is added before the first step of processing finishes; whereas in the Sioplas process the crosslinking catalyst is not added until the second step.

During the use of highly filled thermoplastic and/or moisture-crosslinkable polymer mixtures, PE and/or EVA and/or EPDM and/or EPM and/or PP are chemically modified using formulations made from unsaturated silane esters in the presence of FRG, and inorganic fillers may be incorporated beforehand, at the same time or subsequently.

The chemical modification of the polymers takes place via linkage (grafting) of the silane esters to the polymer chain via free-radical addition. In the first stage of the process it is desirable to homogenize the starting materials, and degradation of the FRGs in this phase is undesirable. Temperature-controlled processing controls the decomposition reaction. The temperature of the reaction components and, the reaction mixture within the polymer reactor or extruder can generally only be controlled via the barrel temperature or by way of internal parts of the plant. Effects within the homogenizing zone, for example shear forces, give rise to local temperature peaks which exceed the critical processing temperature of the FRG. Another issue is the actual decomposition curve of the peroxides. The course of the reaction should ideally correspond to a step function. This mode of reaction is applicable only for relatively high temperatures for a particular peroxide used. Since the polymer melt cannot instantly be brought to, and held at, the precise reaction temperature needed, but instead traverses a temperature gradient, the reaction conversion of the FRG is delayed, meaning that the course of the reaction generally takes the form of a relatively flat "S-shaped curve". The consequence of the two factors is that before the homogenization phase has ended free radicals are produced and in turn cause undesired side-reactions, e.g. C—C linkages of polymer chains, and also local peaks of concentration of grafted silane esters, to mention just a few examples.

These disadvantages have hitherto been countered—without any satisfactory success—by using FRGs of varying decomposition temperature as determined by varying process requirements. Although this shifts the "creeping" FRG degradation, i.e. "prescorch", to higher temperatures, the unfavorable decomposition curve is substantially unaltered. The term prescorch generally means undesired premature crosslinking during the production process of mixing or creeping.

An example of the detailed discussion of this problem in the context of peroxide-crosslinking of elastomers and polyethylenes is that by J. Groepper ("Scorch-verzögernde Peroxide für die Vernetzung von Elastomeren und Polyolefinen" [Scorch-inhibiting peroxides for the crosslinking of elastomers and polyolefins], GAK 2/1994, Volume 47, pages 83 to 88). Here, too, the FRGs to be used for the crosslinking are first incorporated into a polymer matrix, and then the polymer matrix is crosslinked by increasing the temperature, and the use of what are known as SRFRGs (SR="scorch-retardant", i.e. crosslinking-suppressive) is described as an approach for solving the "scorch problem". EP 0 346 863 A1 and JP-A 09-302 043 disclose the use of hydroquinone derivatives as free-radical scavengers. Hydroquinone derivatives generally have the disadvantage of very modest to poor solubility in vinylsilanes, e.g. vinyltrimethoxysilane (VTMO). The combination, as described in JP-A 09-302 043, of high peroxide contents and hydroquinone as SR component can also impair the processability of the extrusion material. For example, no extrusion trials could be carried out using the mixture described in JP-A 09-302 043, since the mixture caused extruder shutdown because the material became non-extrudable.

SUMMARY OF THE INVENTION

Accordingly, it is therefore an object of the present invention to provide another way of dealing with the "scorch" problem. It was also particularly desirable to have the capability of providing very homogeneous products based on polymer or based on filled plastics.

DETAILED DESCRIPTION OF THE INVENTION

Surprisingly, it has been found that a composition in which at least one silicon-containing compound, at least one peroxidic free-radical initiator, and at least one conjugated hydrocarbon and/or an organofunctional silane having a conjugated hydrocarbon group are present can be used in a simple and cost-effective manner to improve scorch conditions in the preparation of grafted and/or crosslinked polymers and of filled plastics. The use of a formulation of the invention therefore permits a further improvement in the preparation and processing of grafted and/or moisture-crosslinkable polymers, polymer preparations, and filled plastics, giving an advantageous reduction in the tendency toward undesired premature decomposition of the FRGs and, respectively, toward undesired grafting before homogenization of the starting materials has begun, and moreover leaving highly homogeneous product. In addition, greater consistency of product quality can be obtained in batches produced at differing times. The use of compositions of the invention therefore permits in particular grafted and/or silane-crosslinked PE, PP, polyolefin copolymer, EVA, EPDM, or EPM to be obtained in an advantageous manner. The viscosity increase occurring during the preparation or processing of polymer preparations or plastic preparations and/or of polymer moldings or plastic moldings is moreover only modest when using the present invention, while high product quality is retained. Furthermore, the reduced tendency toward "prescorch" also reduces the amount of deposits, for example on the screw, and this additionally permits longer machine running times and shorter shutdown times.

The present invention therefore provides a composition in which the components present are
(i) at least one silicon-containing compound,
(ii) at least one peroxidic free-radical initiator, and
(iii) at least one conjugated hydrocarbon and/or at least one organofunctional silane of the general formula I:

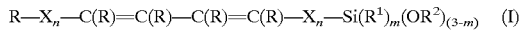

where the groups R are identical or different and R is a hydrogen atom or an alkyl group having from 1 to 3 carbon atoms or an aryl group or an aralkyl group, preferably a methyl group or a phenyl group, $R^1$ is a linear or branched alkyl group having from 1 to 4 carbon atoms, $R^2$ is a linear, branched, or cyclic alkyl group having from 1 to 8 carbon atoms, preferably a methyl, ethyl, n-propyl, or isopropyl group, the groups X are identical or different, and X is a group selected from the series —CH$_2$—, —(CH$_2$)$_2$—, —(CH$_2$)$_3$—, —O(O)C(CH$_2$)$_3$— and —C(O)O—(CH$_2$)$_3$—, and n is 0 or 1, and m is 0, 1, 2 or 3.

At least one silicon-containing compound which bears a silicon-bonded unsaturated organic group is preferably present as silicon-containing compound, component (i) in the composition of the invention.

Particularly preferred silicon-containing compounds present as component (i) are those of the general formula II:

where the groups $R^3$ are identical or different and $R^3$ is a hydrogen atom or a methyl group or a phenyl group, $R^4$ is a methyl group, $R^5$ is a methyl, ethyl, n-propyl, or isopropyl group, and the groups Y are identical or different and Y is a group selected from the series —CH$_2$—, —(CH$_2$)$_2$—, —(CH$_2$)$_3$—, —O(O)C(CH$_2$)$_3$— and —C(O)O—(CH$_2$)$_3$—, and p is 0 or 1, and t is 0 or 1.

It is very particularly preferable for vinyltrimethoxysilane, vinyltriethoxysilane, 3-methacryloxypropyltriethoxysilane, 3-methacryloxypropyltrimethoxysilane, vinyltriacetoxysilane, and/or vinylethoxydimethoxysilane to be present as component (i) in the composition of the invention.

Other compounds mentioned which may also be present in the composition of the invention are alkylalkoxysilanes, such as methyltrimethoxysilane, methyltriethoxysilane, dimethyldimethoxysilane, dimethyldiethoxysilane, ethyltrimethoxysilane, ethyltriethoxysilane, n-propyltrimethoxysilane, n-propyltriethoxysilane, isopropyltrimethoxysilane, isopropyltriethoxysilane, n-butyltrimethoxysilane, n-butyltriethoxysilane, isobutyltrimethoxysilane, isobutyltriethoxysilane, n-octyltrimethoxysilane, n-octyltriethoxysilane, isooctyltrimethoxysilane, isooctyltriethoxysilane, hexadecyltrimethoxysilane, hexadecyltriethoxysilane, and also fluoroalkylalkoxysilanes of the formula $C_nF_{(2n+1)}(CH_2)_2Si(OC_mH_{2m+1})_3$ where n= from 4 to 8 and m=1 or 2, for example trifluoro-1,1,2,2-tetrahydrobutyltrimethoxysilane (n=4, m=1), trifluoro-1,1,2,2-tetrahydrobutyltriethoxysilane (n=4, m=2), nonafluoro-1,1,2,2-tetrahydrohexyltrimethoxysilane (n=6, m=1), nonafluoro-1,1,2,2-tetrahydro-hexyltriethoxysilane (n=6, m=2), tridecafluoro-1,1,2,2-tetrahydrooctyltrimethoxysilane, tridecafluoro-1,1,2,2-tetrahydrooctyltriethoxysilane (n=8, m=2), to mention just a few examples.

At least one free-radical generator (FRG) is present as component (ii) in the composition of the invention, and preference is given to the use of peroxidic free-radical generators selected from the series di-tert-butyl peroxide, dicumyl peroxide, tert-butyl cumyl peroxide, 1,3-di(2-tert-butylperoxyisopropyl)benzene, 2,5-dimethyl-2,5-bis(tert-butylperoxy)hex-3-yne, di-tert-amyl peroxide, 1,3,5-tris(2-tert-butylperoxyisopropyl)-benzene, 1-phenyl-1-tert-butylperoxyphthalide, α,α'-bis(tert-butylperoxy)diisopropyl-benzene, and 2,5-dimethyl-2,5-di-tert-butylperoxyhexane.

According to the invention, at least one conjugated hydrocarbon and/or at least one organofunctional silane of the general formula (I) is present as component (iii) in the present formulation, resulting in a particularly advantageous improvement in scorch conditions over the prior art.

Suitable conjugated hydrocarbons used according to the invention are composed of a mono- or polyunsaturated hydrocarbon chain and of at least one aromatic hydrocarbon group, and it is appropriate here for the olefinic moiety of the compound to be in conjugation with the aromatic moiety of the hydrocarbons.

It is particularly preferable for at least one conjugated hydrocarbon selected from the series 1-phenylpent-1-ene, 2-phenylpent-1-ene, 2,4-diphenyl-4-methylpent-2-ene, 2,4-diphenyl-4-methylpent-1-ene, trans,trans-1,4-diphenylbuta-1,3-diene, 1,2-diphenylpent-1-ene, 1,3-diphenylpent-1-ene, 1,4-diphenylpent-1-ene, 1,5-diphenylpent-1-ene, 1-phenylpenta-1,3-diene, 2-phenylpenta-1,3-diene, 3-phenylpenta-1,3-diene, 4-phenylpenta-1,3-diene, 5-phenylpenta-1,3-diene, 1,2-diphenylpenta-1,3,diene, 1,3-diphenylpenta-1,3-diene, 1,4-diphenylpenta-1,3-diene, and 1,5-diphenylpenta-1,3-diene, to be present in the composition of the invention.

Particular, but non-exclusive, examples of component (iii), the compounds of formula (I), are 1- and 2-(trimethylsiloxy)-buta-1,3-diene, p-(tert-butyldimethylsiloxy)styrene $C_{14}H_{22}OSi$, (m,p-vinylbenzyloxy)-trimethylsilane, (penta-2,4-dienyl)trimethylsilane, styrylethyltrimethoxysilane.

Component (iii) of the composition of the invention may be at least one conjugated hydrocarbon or at least one compound of formula (I), a mixture of two or more conjugated hydrocarbons, a mixture of two or more compounds of the general formula (I) or a mixture made from at least one hydrocarbon and from at least one compound of the general formula (I).

The ratio by weight between components (ii) and (iii) in the composition of the invention is preferably from 20:1 to 1:15, particularly preferably from 5:1 to 1:2, very particularly preferably from 4:1 to 2:1.

It is particularly preferable for the composition of the invention to comprise the components vinyltrimethoxysilane, dicumyl peroxide and 1,2-diphenylpent-1-ene. Particular preference is also given to the formulation made from vinyltrimethoxysilane, tert-butyl cumyl peroxide and 2,4-diphenyl-4-methylpent-2-ene.

Where appropriate, at least one catalyst may be present as further additive component (iv) in the composition of the invention for the crosslinking of silyl groups grafted onto polymer. Catalysts of this type usually serve to accelerate hydrolysis and condensation. Among the examples which may be mentioned are inorganic acids, organic acids, organic bases, carboxylates of metal, such as those of tin, of zinc, or iron, of lead, of cobalt, organotin compounds, titanic esters, and also PE-compatible sulfonic acid derivatives.

According to the invention, it is preferable for the component (iv) used to comprise di-n-butyltin laurate (DBTL), dibutyltin diacetate, dioctyldibutylamine, hexylamines, pyridine, hydrochloric acid, sulfuric acid, acetic acid, stearic acid, maleic acid, maleic anhydride, or toluene sulfonic acids.

Another component which may be present in the composition of the invention is at least one heat stabilizer, for example pentaerythrityl tetrakis[3-(3,5-bis(1,1-dimethylethyl)-4-hydroxyphenyl)propionate], octadecyl 3-(3,5-di-tert-butyl-4-hydroxyphenyl)propionate, and also 4,4'-bis(1,1-dimethylbenzyl)diphenylamine.

An additional component which may be present in the composition of the invention is a metal deactivator, such as N,N'-bis(3-(3,5-di-tert-butyl-4-hydroxyphenyl)propionyl) hydrazine, or else tris-(2-tert-butyl-4-(2'-methyl-4'-hydroxy-5'-tert-butyl)thiophenyl-5-methylphenyl) phosphite.

The composition of the invention is generally prepared by mixing and stirring the separate components, and preferably comprises from 60% to 99.9% by weight of at least one silicon-containing compound, from 0.05 to 10% by weight of at least one peroxidic free-radical initiator, from 0.01 to 10% by weight of at least one conjugated hydrocarbon, where appropriate from 0.1 to 10% by weight, preferably from 2 to 8% by weight, of a catalyst component. Each of the amounts stated is based on the entire composition, and all of the components or constituents of the composition together give 100% by weight.

The composition of the invention is usually used in liquid form. However, it is also possible for the composition of the invention to be applied to a porous, particulate, swellable support, where appropriate a foam support—for example polyolefins, such as PE or PP, or EVA, or polymer blends, and used in what could be called "dry form" for the crosslinking of polymers, as described in EP 0 426 073 A2 (incorporated herein by reference), for example.

The composition of the invention is in particular used in the preparation of grafted and/or crosslinked polymers, of filled plastics, and also of filled crosslinked plastics.

In the preparation of the graft polymers by the Sioplas process (U.S. Pat. No. 3,646,155 the portions relevant to the extrusion of thermoplastics incorporated herein by reference), the polymer and the composition of the invention are generally placed into a compounding assembly, e.g. an extruder. It is appropriate for at least components (i), (ii), and (iii) to be present in the inventive composition used here. The composition may be injected directly into the extruder by way of a suitable metering device or, as an alternative, charged together with the polymer into the polymer feed hopper, where it may be intimately mixed with the polymer. The chemical reactions proceeding in the compounding assembly are controlled by way of the barrel temperature. After this first step of the process, the product is generally pelletized and packed so as to exclude air and moisture. This material known as Sioplas material is then processed in a second step of the process with addition of a crosslinking catalyst, to give the final product, for example to give items such as pellets, cables, pipes, etc. Mention may also be made of examples of other molding processes for plastics, including the film production, blow molding, rotational molding, foaming, injection molding, roll-milling, and also compression molding.

In single-stage processes, such as Monosil processes (U.S. Pat. No. 4,117,195 the portions relevant to the extrusion of thermoplastics incorporate herein by reference), the polymer and the mixture initiating the crosslinking are charged to the extruder, and the resulting material is processed to give the final product in a single step. An appropriate composition of the invention used here is a preparation in which the components (i), (ii), (iii), and (iv) needed for this process are already present.

For the preparation of filled plastics, the inorganic filler is mostly introduced directly to the compounding assembly and processed with the polymer to give the final product. The filler may also optionally be introduced into the assembly at a later juncture, e.g. into a twin-screw extruder or co-kneader. The graft polymer produced using the composition of the invention can provide a marked improvement in the compatibility of non-polar polymer and polar filler, such as aluminum hydroxide. There is also the possibility of preparing graft polymer, in particular Sioplas material, separately and of storing this and then supplying it as a base material to a further processor, such as a cable producer, who in turn incorporates filler and produces final filled plastics products.

Using a method known per se and the composition of the invention, therefore, improved processing conditions can be achieved and pellets or items can be produced which are intrinsically highly homogeneous, for example moldings, cables, cable insulation, cable sheathing, sanitation pipes, drinking water pipes, waste water pipes, hot water pipes, foams, injection moldings, shrink products, and many others, with a further improvement in quality.

The present invention therefore also provides the use of a composition of the invention in the production of grafted and/or crosslinked polymers, and also in the production of filled plastics.

The present invention also provides the Sioplas process, and also the Monosil process, where these comprise the use of a composition of the invention.

The present invention likewise provides polymers, filled plastics, and also moldings, obtainable using a composition of the invention.

The present invention moreover provides items based on at least one such inventive polymer, plastic, and/or molding.

The present invention can therefore give marked further improvement in scorch conditions.

Use of the composition of the invention in particular achieves a considerable improvement in flow properties. The associated characteristic MFR value ("melt flow rate" or melt index MFI) increases, and the viscosity of the polymer melt therefore falls. Use of compositions of the invention generally also results in lower head pressures at the extruder outlet than in grafting processes of the prior art, and this increases the output rate of final products, and also reduces the mechanical stress on the tooling used. The lower viscosity thus achieved also permits the production or, respectively, improves the production of injection moldings. Another advantage of the present invention is the reduced tendency toward crosslinking prior to wet-aging, and this is reflected macroscopically in better product surface quality as a result of lowered melt viscosity. An indicative feature here is the lower gel content. In addition, the exceptionally good surfaces of the test specimens or products obtained using compositions of the invention are not associated with any adverse effect on the quality of, or quantity of, crosslinking.

All of these advantages may likewise be observed during direct production of moldings in a single step. The above-mentioned advantages may equally be observed during the production of silane-grafted polymers, during the production of filled thermoplastic and/or moisture-crosslinking polymer preparations, and also during the further processing of products in a second shaping step.

It is particularly advantageous that the composition of the invention can be dispersed in commercially available starting materials or crosslinker preparations, such as vinylsilane or vinylsilane preparations, e.g. of DYNASYLAN® SILFIN type, with crosslinking catalysts and/or other additives, like stabilizers, or may be added in the form of masterbatches together with other additives.

The new preparations may advantageously therefore be used in existing production plants as replacement for conventional preparations, without requiring any substantial change to be made to the processing conditions.

The examples below give further illustration of the present invention. The examples are not intended to limit the invention.

EXAMPLES

Explanations relating to examples A and B

The test methods used were as follows:

| | | |
|---|---|---|
| MFR (Melt index at 21.6 kg and 190° C.) | [g/10 min] | DIN 1133 |
| Hot Set (200° C.; 15 min; 20 N/cm²) | [%] | EN ISO 60811-2-1 |
| Gel content (boiling p-xylene, 8 h) | [%] | DIN 16 892 |

TABLE 1

| Starting materials | |
|---|---|
| Name | Description |
| PE 1 | PE-LLD, BPD 3042 from BP Chemicals |
| PE 2 | PE-LLD, Flexirene ® MR 50, Polimeri Europa |
| VTMO | Vinyltrimethoxysilane, Degussa AG |
| Free-radical scavenger 1 | Hydroquinone |
| Free-radical scavenger 2 | 2,4-Diphenyl-4-methylpent-1-ene |
| Peroxide 1 | Di(tert-butyl) peroxide, Peroxid Chemie |
| Peroxide 2 | 2,5-Dimethyl-2,5-di(tert-butylperoxy)hexane, Peroxid Chemie |
| Peroxide 3 | tert-butyl cumyl peroxide, Peroxid Chemie |

TABLE 1-continued

| Starting materials | | |
|---|---|---|
| Name | Description | |
| Peroxide 4 | 1,3-Di(2-tert-butylperoxyisopropyl)benzene, Peroxid Chemie | |
| DBTL | Dibutyltin dilaurate, Th. Goldschmidt | |
| Preparation 1 | VTMO | 86.4% |
| | Peroxide 2 | 10.4% |
| | Free-radical scavenger 2 | 2.58% |
| | DBTL | 3.2% |
| Preparation 2 | VTMO | 87.7% |
| | Peroxide 1 | 7.3% |
| | Free-radical scavenger 1 | 1.8% |
| | DBTL | 3.2% |
| Preparation 3 | VTMO | 92.4% |
| | Peroxide 1 | 4.4% |
| | DBTL | 3.2% |
| Preparation 4 | VTMO | 90.15% |
| | Peroxide 3 | 6.55% |
| | DBTL | 3.2% |
| Preparation 5 | VTMO | 96.6% |
| | Peroxide 2 | 4.72% |
| | Free-radical scavenger 2 | 1.58% |
| | DBTL | 3.2% |
| Preparation 6 | VTMO | 91.62% |
| | Peroxide 4 | 5.18% |
| | DBTL | 3.2% |

Example A

Studies in comparison to JP-A 09-302 043 (the portion relevant to the extension conditions of the polymer are incorporated herein by reference) are carried out using preparation 1 of the invention. To this end, both solubility studies and extrusion studies were carried out. However, in the extrusion studies the HDPE mentioned in JP-A 09-302 043 was not used, since previous results have shown that the use of the amounts there mentioned of peroxide would exacerbate premature crosslinking reactions in the extruder and thus also cause large-scale processing problems. The inventors therefore decided to use a low-viscosity injection molding grade (PE 2).

A1 Problems with Dissolving Hydroquinone (Free-radical Scavenger 1) in VTMO (vinyltrimethoxysilane)

The solution trials take place at room temperature and ambient pressure, by first charging 5 g of VTMO to a test tube. Free-radical scavenger 1 is then added in 0.2 g portions to the solvent. Even with small amounts added, solution of the free-radical scavenger 1 takes place very slowly. At about 1.2 g the solubility limit has been achieved. This corresponds to a maximum possible concentration of 2.4% by weight of hydroquinone in VTMO (at room temperature and ambient pressure).

Comparable studies are carried out by way of example with 2,4-diphenyl-4-methylpent-1-ene (free-radical scavenger 2) under the same conditions. The two components (VTMO, free-radical scavenger 2) are found to be miscible without difficulty in all possible ratios.

A2 Comparative extrusion study using preparation of JP-A 09-302 043 and using preparation 1 of the invention PE 2 is aged for a period of one hour at a temperature of 70° C. in a circulating-air drying cabinet. 12 g per kg of PE 2 of each of preparations 1 and 2 are added to the dried PE 2 and absorbed by the PE 2 over a period of 1 hour. Processing takes place on a corotating twin-screw extruder from the company Berstorff (length/screw diameter=33, screw diameter=25 mm). The rotation rates are 100 rpm and the temperatures rise from 135 to 210° C. in the direction of the extruder outlet. 4 kg/h of the polyethylene comprising the respective preparation are metered gravimetrically into the extruder. Tapes are produced.

The MFR values (21.6 kg and 190° C.), and also the gel contents, are determined directly after extrusion. The extruder head pressures arising are noted during each compounding procedure. The tapes are crosslinked in a water bath (6 hours, 80° C.) and then the hot set and the gel content of the crosslinked specimens are determined.

The results of the study are listed in table 2 below.

TABLE 2

| Poly-ethylene | Pre-paration | Amount added [g/kg PE] | Head pressures [bar] | Gel content 0 h [%] | Gel conent 6 h, 80° C. H₂O [%] | Hot set [%] | MFR 21.6/ 190° C. [g/10 min] |
|---|---|---|---|---|---|---|---|
| PE2 | 2 | 12 | 16 | 0 | 39.2 | Specimen >175 not fractured | 1.1 |
|  | 1 | 12 | 8 | 0 | 0.2 | fractured | 9.2 |

The results clearly show that the preparation of JP-A 09-302 043 does not give any crosslinking at all. In contrast to this, the specimens can be crosslinked using preparation 1 of the invention.

Example B
Trials with Various FRGs with and without Free-radical Scavenger

PE 1 is aged for a period of one hour at a temperature of 70° C. in a circulating-air drying cabinet. 10 g/kg of PE 1 of each of preparations 3, 4, 5, and 6 are added to the dried PE 1 and absorbed by the PE 1 over a period of 1 hour. Processing takes place on a corotating twin-screw extruder from the company Berstorff (length/screw diameter=33, screw diameter=25 mm). The rotation rates are 100 rpm and the temperatures rise from 135 to 210° C. in the direction of the extruder outlet. 4 kg/h of the polyethylene comprising the respective preparation are metered gravimetrically into the extruder. Tapes are produced.

The MFR values (21.6 kg and 190° C.), and also the gel contents, are determined directly after extrusion. The extruder head pressures arising are noted during each compounding procedure. The tapes are crosslinked in a water bath (6 hours, 80° C.) and then the hot set and the gel content of the crosslinked specimens are determined.

The results of the study are listed in table 3 below.

TABLE 3

| Poly-ethylene | Pre-paration | Amount added [g/kg PE] | Head pres-sures [bar] | Gel content 6 h, 80° C. H₂O [%] | Hot set [%] | MFR 21.6/ 190° C. [g/10 min] |
|---|---|---|---|---|---|---|
| PE 1 | 3 | 10 | 19–20 | 58 | 80 | 34 |
|  | 4 | 10 | 20 | 60 | 90 | 31 |
|  | 5 | 10 | 18–19 | 57 | 75 | 40 |
|  | 6 | 10 | 19–20 | 60 | 75 | 34 |

Summary of Results of Trials

Comparison of the values clearly shows the advantage of preparation 5 of the invention. In comparison with all of the other preparations, the use of preparation 5 of the invention results in the lowest viscosities, while the final properties of all of the specimens are comparably good.

In practice this means that the use of preparation 5 permits higher output rate (economic advantage) and extrudate surface quality, while there is no adverse effect on the final properties of the product.

German application 10142555.4 filed on Aug. 30, 2001 is incorporated herein by reference in its entirety.

Obviously, numerous modifications and variations of the present invention are possible in light of the above teachings. It is therefore to be understood that within the scope of the appended claims, the invention may be practiced otherwise than as specifically described herein.

What is claimed is:

1. A composition comprising
   (i) at least one silicon-containing compound;
   (ii) at least one peroxidic free-radical initiator; and
   (iii) at least one conjugated hydrocarbon comprising a mono- or polyunsaturated hydrocarbon chain and at least one aromatic hydrocarbon group, and/or at least one organofunctional silane of formula I:

$$R—X_n—C(R)=C(R)—C(R)=C(R)—X_n—Si(R^1)_m(OR^2)_{(3-m)} \quad (I),$$

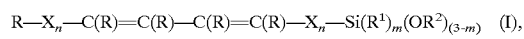

where the groups R are identical or different, and R is a hydrogen atom, an alkyl group having from 1 to 3 carbon atoms, an aryl group or an aralkyl group, $R^1$ is a linear or branched alkyl group having from 1 to 4 carbon atoms, $R^2$ is a linear, branched, or cyclic alkyl group having from 1 to 8 carbon atoms, the X groups are identical or different, and X is —CH₂—, —(CH₂)₂—, —(CH₂)₃—, —O(O)C(CH₂)₃— or —C(O)O—(CH₂)₃—, n is 0 or 1, and m is 0, 1, 2 or 3, and wherein the monounsaturated hydrocarbon chain of the conjugated hydrocarbon contains four or more carbon atoms.

2. The composition of claim 1, further comprising
   (iv) at least one catalyst for crosslinking of silyl groups grafted onto a polymer.

3. The composition of claim 2, wherein component (iv) is selected from the group consisting of di-n-butyltin laurate, dibutyltin diacetate, dioctyldibutylamine, hexylamine, pyridine, hydrochloric acid, sulfuric acid, acetic acid, stearic acid, maleic acid, maleic anhydride, toluenesulfonic acid and mixtures thereof.

4. The composition of claim 1, wherein component (i) is at least one silicon-containing compound which bears a silicon-bonded unsaturated organic group.

5. The composition of claim 4, wherein component (i) is at least one silicon-containing compound of formula II:

$$(R^3)_2C=C(R^3)—Y_p—Si(R^4)_i(OR^5)_{(3-i)} \quad (II),$$

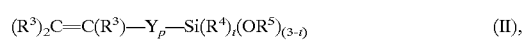

where the groups $R^3$ are identical or different, and $R^3$ is a hydrogen atom a methyl group or a phenyl group, R⁴ is a methyl group, R⁵ is a methyl, ethyl, n-propyl, or isopropyl group, the groups Y are identical or different, and Y is —CH₂—, —(CH₂)₂—, —(CH₂)₃—, —O(O)C(CH₂)₃— or —C(O)O—(CH₂)₃—, p is 0 or 1, and t is 0 or 1.

6. The composition of claim 5, wherein component (i) is selected from the group consisting of vinyltrimethoxysilane, vinyltriethoxysilane, 3-methacryloxypropyltriethoxysilane, 3-methacryloxypropyltrimethoxysilane, vinyltriacetoxysilane, vinylethoxydimethoxysilane and mixtures thereof.

7. The composition of claim 1, wherein component (ii) is at least one peroxidic free-radical initiator selected from the group consisting of di-tert-butyl peroxide, dicumyl peroxide, tert-butyl cumyl peroxide, 1,3-di(2-tert-butylperoxyisopropyl)benzene, 2,5-dimethyl-2,5 -bis(tert-butylperoxy)hex-3-yne, di-tert-amyl peroxide, 1,3,5-tris(2-tert-butylperoxyisopropyl)benzene, 1-phenyl-1-tert-butylperoxyphthalide, α,α'-bis(tert-butylperoxy)diisopropylbenzene and 2,5-dimethyl-2,5-di-tert-butylperoxyhexane.

8. The composition of claim 1, wherein component (iii) is at least one conjugated hydrocarbon selected from the group consisting of 1-phenylpent-1-ene, 2-phenylpent-1-ene, 1,2-diphenylpent-1-ene, 1,3-diphenylpent-1-ene, 1,4-diphenylpent-1-ene, 1,5-diphenylpent-1-ene, 1-phenylpenta-1,3-diene, 2-phenylpenta-1,3-diene, 3-phenylpenta-1,3-diene, 4-phenylpenta-1,3-diene, 5-phenylpenta-1,3-diene, 1,2-diphenylpenta-1,3-diene, 1,3-diphenylpenta-1,3-diene, 1,4-diphenylpenta-1,3-diene, 1,5-diphenylpenta-1,3-diene, 2,4-diphenyl-4-methylpent-2-ene, 2,4-diphenyl-4-methylpent-1-ene, and trans,trans-1,4-diphenylbuta-1,3-diene.

9. The composition of claim 1, comprising from 60 to 99.9% by weight of component (i), from 0.05 to 10% by weight of component (ii), from 0.01 to 10% by weight of component (iii), wherein component (i) is at least one silicon-containing compound of formula (II)

$(R^3)_2C=C(R^3)-Y_p-Si(R^4)_t(OR^5)_{(3-t)}$ (II)

where the groups R³ are identical or different, and R³ is a hydrogen atom, a methyl group or a phenyl group, R⁴ is a methyl group, R⁵ is a methyl, ethyl, n-propyl, or isopropyl group, the groups Y are identical or different, and Y is —CH₂—, —(CH₂)₂—, —(CH₂)₃—, —O(O)C(CH₂)₃— or —C(O)O—(CH₂)₃—, p is 0 or 1, and t is 0 or 1, wherein component (ii) is at least one peroxidic free-radical initiator, component (iii) is at least one conjugated hydrocarbon and/or an organofunctional silane of formula (I), and the amounts are based on the total weight of the composition, and the sum of the weight percent of all constituents is 100%.

10. The composition of claim 9, further comprising from 0.1 to 10% by weight of at least one catalyst component (iv) for crosslinking silyl groups grafted on a polymer.

11. The composition of claim 1, wherein the ratio by weight of components (ii) and (iii) is from 20:1 to 1:15.

12. The composition of claim 1, further comprising at least one heat stabilizer and/or one metal deactivator.

13. A process for preparing one or more grafted and/or crosslinked polymers, comprising:

reacting a polymer with the composition of claim 1.

14. A process for preparing a filled plastic, comprising:

reacting a mixture of a polymer and a filler with the composition of claim 1.

15. A process for preparing one or more graft copolymers, comprising:

mixing the composition of claim 1 with a polymer to form a Sioplas material, then processing said Sioplas material in the presence of a crosslinking catalyst.

16. A single stage process for the preparation of one or more graft copolymers, comprising:

reacting a polymer and the composition of claim 1 in the presence of a crosslinking catalyst in an extruder to form said one or more graft copolymers.

17. A polymer or a filled plastic obtained by the process of claim 13.

18. A filled plastic obtained by the process of claim 14.

19. A polymer or a filled plastic obtained by the process of claim 15.

20. A polymer or a filled plastic obtained by the process of claim 16.

21. A molded article comprising the polymer or the filled plastic of claim 17.

22. A molded article comprising the filled plastic of claim 18.

23. A molded article comprising the polymer or the filled plastic of claim 19.

24. A molded article comprising the polymer or the filled plastic of claim 20.

25. The composition of claim 1, wherein the monounsaturated hydrocarbon chain of the conjugated hydrocarbon contains five or more carbon atoms.

* * * * *